TWO-STATE SWITCHOVER AMPLIFIER SYSTEM
WITH PLURAL CURRENT SOURCES
Filed Sept. 26, 1969

INVENTOR.
William R. Fowler
Thomas W. Hart Jr.
BY
Mueller, Aichele & Rauner
ATTY'S.

3,546,484

TWO-STATE SWITCHOVER AMPLIFIER SYSTEM WITH PLURAL CURRENT SOURCES

William R. Fowler, Scottsdale, and Thomas W. Hart, Jr., Phoenix, Ariz., assignors to Motorola, Inc., Franklin Park, Ill., a corporation of Illinois Filed Sept. 26, 1969, Ser. No. 861,276
Int. Cl. H03k 17/00
U.S. Cl. 307—254 5 Claims

ABSTRACT OF THE DISCLOSURE

An input differential switch drives two dual level voltage translators each having a predetermined threshold of responsiveness. The dual level translators supply digital signals to a differential output switch which supplies the two level output signals of the amplifying system. A current source regulator supplies a constant control signal to a plurality of independent semiconductor current sources. Each of the current sources is independently connected to the differential input switch, the two dual level voltage translators and a differential output switch for supplying constant current therethrough in accordance with the requirements thereof. The current amplitude is predetermined by the emitter-base junction area of the current source semiconductor devices.

BACKGROUND OF THE INVENTION

Figures 1, 2:
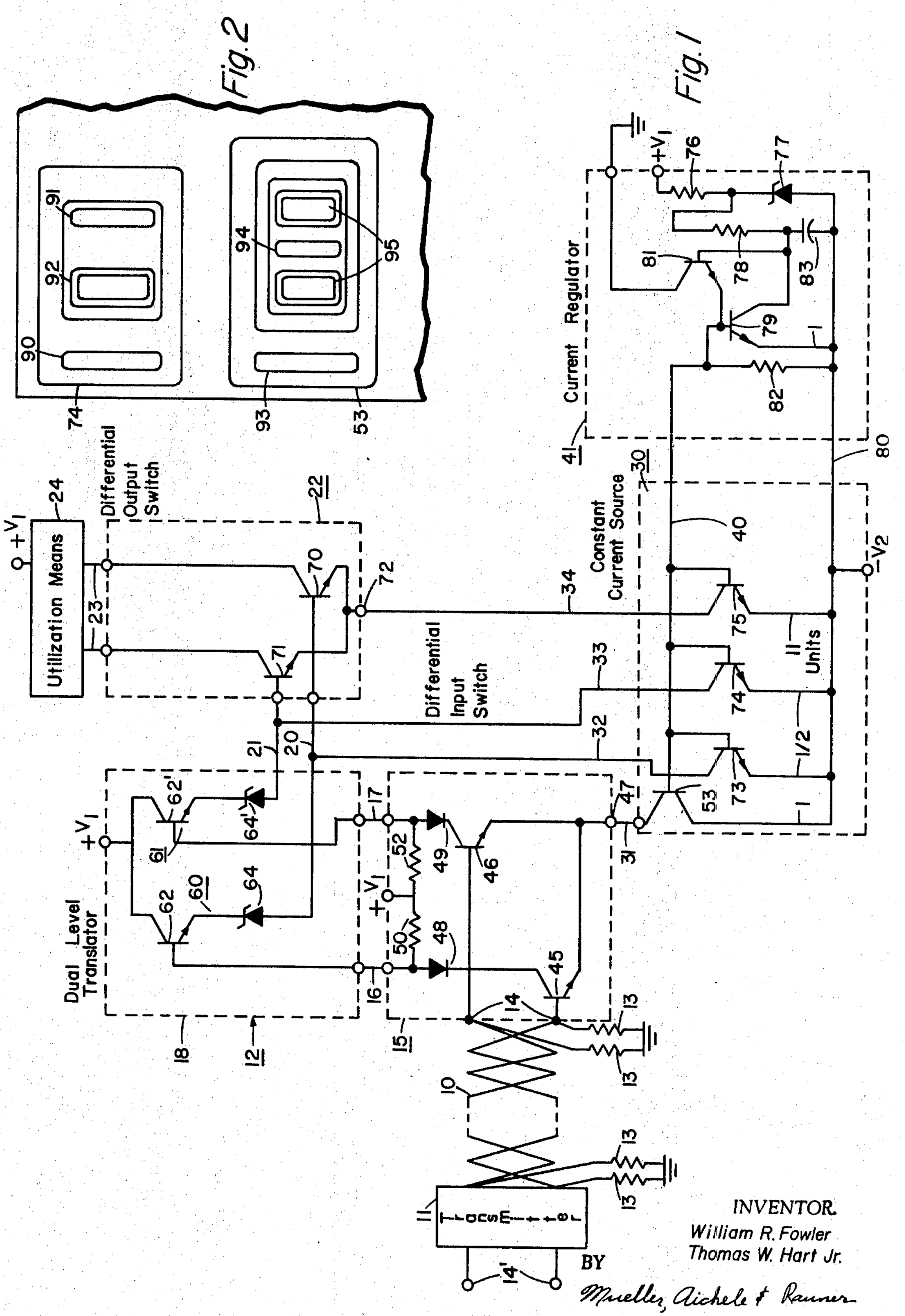

This invention relates to amplifying systems and more particularly to a two-state amplifier system which is adapted to be connected to a balanced differential transmission line, for example, a twisted pair line, as either a transmitter or a receiver amplifying system.

In many digital applications there is a requirement for the transfer of pulses or other forms of digital signals over an extended distance. The term "extended distance" is relative to the frequency involved. For example, in some instances a distance of fifty feet may be an extended distance, whereas, in other instances, a distance of a quarter of a mile or several miles is an extended distance. Further, such transmission of digital signals may be through a noisy environment which requires the utilization of a twisted pair for noise immunity. The twisted pair is much less expensive than the utilization of a coaxial cable; therefore, an amplifying system utilizable with a twisted pair line is much preferred.

Also in the production of electronic systems, it is desired to standardize on as many parts and modules as possible. This is particularly true in amplifier systems wherein a large number of such amplifying systems may be utilized in different parts of an electronic system or equipment. This is especially true where there is communication over communication lines such as twisted pair or coaxial cable. Therefore, it is desirable to have an amplifier system that is utilizable as either a receiver from such a line or as a transmitter into such a line.

With the recent advent of monolithic integrated circuits, it is desired to have a circuit configuration which is readily integratable into monolithic form. Such design permits wide tolerances in the fabrication of the integrated circuit in order to increase yield and thereby decrease cost to the user. In addition, in many digital circuits a current mode type of switching is desired. This requires the utilization of a constant current source. It is desired to have in a monolithic integrated circuit a plurality of constant current sources for a like plurality of stages of amplification or other signal processing steps which current sources are closely matched for ease of manufacture of the circuit.

Many digital circuits are of the differential switch type. Such differential switches should have a high common mode voltage rejection in order to provide a more reliable output signal. In addition, such amplifiers should efficiently use power such that the power utilized in the circuit is minimized. All of these requirements require close component matching which is more realizable in integrated form than it is in many discrete form systems especially as to the relationship of various semiconductive devices utilized in the fabrication of an amplifying system.

SUMMARY OF THE INVENTION

It is an object of the present invention to provide an improved easily integratable amplifying system capable of amplifying signals having two discrete signal states.

It is another object of the invention in conjunction with the immediately preceding object to provide an amplifying system having a plurality of signal processing stages with each stage independently having an independent constant current supplied thereto.

A feature of the present invention is the provision of a plurality of constant current sources in a monolithic integrated circuit chip utilizing transistor elements but having an emitter-base junction area in accordance with the desired constant current amplitude.

It is another feature in an amplifying system to provide a dual level voltage translator having voltage threshold means for discriminating between two level input signals supplied by a differential input switch thereto and then supply the discriminated input signal to a differential output switch.

In accordance with one embodiment of the present invention which is attachable to a twisted pair line which is terminated in accordance with the characteristic impedance thereof, signals are received by a differential input switch having a pair of transistor elements in integrated circuit form with a common connection to a current source which supplies a current of predetermined amplitude in accordance with its emitter-base junction area. The collectors of the transistors in the differential input switch are connected respectively to control electrodes of a second pair of transistors in separate dual voltage level translators. The dual voltage level translator transistors supply signals to the Zener diodes which serves to translate the signals to a lower voltage level. The Zener diodes supply translated signals to a differential output switch. A constant current source is connected to the connection between the Zener diodes and a differential output switch input connection for causing a constant current flow therethrough. The differential output switch has a pair of transistor elements with a common emitter connection to another constant current source which supplies a constant current through the differential output switch. All of the independent constant current sources are regulated by a single current source regulator which supplies a predetermined signal between the base and the emitter electrodes of the various constant current source transistors. The twisted pair line may be either connected to the input differential switch or the output differential switch or the amplifier may be utilized to amplify between two sets of twisted pair lines.

THE DRAWING

FIG. 1 is a schematic diagram of an amplifying system utilizing the teachings of the present invention, and FIG. 2 is a diagrammatic plan view of part of a chip on which a constant current source is applied showing current source transistors having a small and larger area emitter-base junction for supplying a small or larger constant current amplitude.

DETAILED DESCRIPTION OF THE ILLUSTRATIVE EMBODIMENT

Referring more particularly to FIG. 1 of the accompanying drawing, an amplifying system 12 embodying the present invention is connected to a twisted line pair 10. The twisted line pair 10 is connected to the output of a transmitter 11. If desired, another twisted line pair (not shown) may be connected to the output leads 23 instead of the utilization device 24 and another such amplifying system 12 (not shown) may be connected to the other twisted line pair. In the illustrated system, the transmitter 11 may be an amplifying system such as the system 12. Receiver 12 is shown in detailed form, it being understood that like connections are made to amplifier 11.

The twisted pair 10 is terminated at each end by the resistors 13 each having an ohmic value equal to one-half the characteristic impedance of twisted pair line 10. Amplifier 12 comprises a differential input switch 15, a dual level translator 18, a differential output switch 22, a constant current source 30, and a current regulator 41. The input terminals 14, which may correspond to input terminals 14′ of the transmitter 11, comprise the input terminals of the amplifier system 12. Input terminals 14 supply the received signals to the differential input switch 15. Differential input switch 15 supplies its output signals over a pair of lines 16 and 17 to dual voltage level translator 18. Dual level voltage translator 18 is responsive to the signals on lines 16 and 17 to supply a differential signal over one of the lines 20 and 21, in accordance with the received signals over terminals 14, to the differential output switch 22. Differential output switch 22 supplies an amplified digital signal over the lines 23 to utilization means 24. Utilization means 24 may be another twisted pair of lines or may be some other equipment. In addition, terminating impedances may be added to lines 23 for effecting more efficient signal transfer. A plurality of current sources located within dotted box 30 are respectively connected over lines 31 through 34 to the differential input switch 15, the dual voltage level translator 18, as well as to the differential output switch 22. The magnitude of the currents applied over the lines 31 through 34 is predetermined by the planar junction area of the emitter regions of the current source transistors as will be later more fully referred to in connection with FIG. 2. The current sources 30 receive control voltage over a pair of lines 40 and 80 from current source regulator 41. Current source regulator 41 supplies a constant voltage between lines 40 for biasing the current sources 30 comprising various transistor elements, as will be explained, to predetermined current conductive states to thereby provide constant current flows over the lines 31 through 34. All of the amplifying system elements 15, 18, 22, 30, and 41 are formed in a single monolithic integrated circuit die. In some constructed embodiments of the present invention, two such amplifying systems were integrated in a single monolithic integrated circuit die. The integration of the illustrated circuit is quite easily accomplished because of the tolerances provided by the circuit configuration.

Differential input switch 15 includes a pair of differentially connected transistors 45, 46 having their emitters connected directly to a current source terminal 47 which in turn is connected to constant current line 31. The collector electrodes of the transistors 45 and 46 are respectively connected to the cathodes of a pair of diodes 48 and 49. The anodes of the diodes 48 and 49 are connected to lines 16 and 17 as well as through resistors 50 and 52 to the collector supply voltage $V_1$. As the input signals on terminals 14 switch transistors 45 and 46 between the current conduction and nonconduction, there is a constant current flow from collector supply voltage $V_1$ through the resistor diode networks 48 through 52, thence through one of the two transistors 45, 46 and over line 31 to current source transistor 53 as will be more fully described later. It is remembered that transistors 45 and 46 are alternately in current conduction or conconduction state. Also, during the transition of current condition, the current flow in the resistors 50 and 52 is equal at about the desired threshold value. When transistor 45 is at current nonconduction, the voltage on line 16 approximates that of voltage $V_1$, and, correspondingly, the transistor 46 is current conductive, which then clamps the voltage on line 17 essentially to a voltage equal to $+V_1$ minus the voltage drop in the resistor 52 due to the constant current flow from the transistor 53. Correspondingly, when transistor 45 is current conductive and transistor 46 is current nonconductive, the voltages on lines 16 and 17 are the reverse of that just described.

The dual voltage level translator 18 includes two level translators 60 and 61. Since the translators are identical, like numbers are used to designate the parts; however, the parts of translator 61 have primed numbers. Each translator has a transistor 62 or 62′ having its collector electrode connected to the collector supply voltage $V_1$. The base electrodes of transistors 62 and 62′ are respectively connected to lines 16 and 17. The emitters of the transistors 62 and 62′ are connected to the cathodes of respective Zener diodes 64 and 64′ which are always conductive, and the anodes of the Zener diodes 64 and 64′ are connected to the output leads 20 and 21 of the dual level translator 18. The leads 20 and 21 are connected by leads 32 and 33, respectively, to output terminals of the constant source 30. As will be explained, the transistors 62 and 62′ are emitter followers and they are never fully blocked. The Zener diodes 64 and 64′ reduce the voltage appearing at the emitters of the transistors 62 and 62′ by their internal voltage drop and apply this reduced voltage to the bases of the transistors 70 and 71 included in the differential output switch 22.

Differential output switch 22 includes the pair of differentially interconnected transistors 70 and 71 which have their common emitter connections connected to the current source terminal 72, thence over lines 34 to current sources 30. This differential output switch 22 operates in the same manner as differential input switch 15 with the collector electrode loading means applied by utilization means 24 in a known manner. Due to the action of the Zener diodes 64 and 64′, the bases of the transistors 71 and 70 are so low that neither of them becomes saturated over a wide range of output voltages on lines 23. That one which has the lower voltage on its base does not conduct and the other transistor is conductive. Let it be assumed that the base of the transistor 70 is lower than the base of the transistor 71. Then the transistor 71 conducts. There will be current flowing over line 21 which then supplies current to line 33 to current sources 30 and also to the base electrode of transistor 71 which is current conductive. The constant current on line 34 then flows through transistor 71 while transistor 70 is current nonconductive. Upon causing the base of the transistor 71 to be lower than the base of the transistor 70, the conductivities of transistors 70 and 71 are reversed in a known manner to thereby selectively supply bistate digital signals over lines 23 to utilization means 24. Utilization means 24 may have a voltage terminal $V_1$ in the same manner that the stages 15 and 18 of the amplifying system have such terminal $V_1$.

The current permitted to flow through current sources 30 is determined at the base electrodes of the individual current source transistors 53, 73, 74, and 75 as they are connected to the line 40 with emitter electrodes thereof connected to the line 80. In current regulator 41, a constant potential is developed by voltage regulator diode 77 which receives current through load resistor 76 from voltage source $V_1$. The regulated voltage is supplied through resistor 78 which is then supplied through the collector of transistor 79 thence to voltage reference line 80 which is connected to voltage source $V_2$. The voltage drop across resistor 78 is related to the collector current of transistor 79 and thereby regulates the base voltage of transistor 79 through the emitter follower action of transistor 81. The base electrode of transistor 81 is connected to the junction between resistor 78 and the collector of transistor 79. The regulated voltage supplied through resistor 78 controls the emitter follower action of transistor 81 which supplies base drive current to transistor 79. It is seen that the emitter electrode of transistor 81 is connected to the base electrode of transistor 79 and to resistor 82 which has its other end connected to reference potential line 80. Therefore, there is a constant voltage supplied between reference line 80 and the line 40 as will be more fully described. The collector current of transistor 79 is a regulated "unit" current, while the collector currents of the individual current source transistors 53, 73, 74, and 75 are scale values of the unit current. The current amplitude scaling is accomplished by a ratio of the planar area of the emitters of the various transistors in current sources 30. For example, if the collector current of transistor 53 is desired to be twice the current of the collector of transistor 79, then transistor 53 would have an emitter of twice the planar area of the emitter of transistor 79. Similarly, the other currents supplied through the various current sources 30 comprising transistors 73 through 75 are similarly scaled based upon the emitter size, i.e., the planar junction dimension, of transistor 79. The just described current source system is not practical in discrete circuits because of the variations in the fabrication of transistors. However, when such transistors are fabricated on the same monolithic integrated circuit die and in the proximate geographic area on such die, the variation between transistors so formed is very small. This feature of applicants' invention is illustrated in FIG. 2 and further described hereinbelow.

Capacitor 83 is physically a reverse biased diode built as part of the integrated circuit die and is used to control the response of current regulator 41.

As noted above, the several transistors 53, 73, 74, and 75 may supply constant current. It is also noted that these transistors as well as the transistor 79 are put on a single chip or die as illustrated in part in FIG. 2, whereby the current supplied by a transistor can be determined by determining the area of the emitters of the several transistors in the construction steps. In an actual amplifier as here described, the current flow through the transistor 53 and the transistor 79 was one unit of current. The current flow through the transistors 73 and 75 was one-half unit and the current flow through the transistor 75 was eleven units.

Referring next to FIG. 2, there is shown in diagrammatic plan view form two transistors 74 and 53 having differing emitter planar extent or area. The transistor 74 has a collector contact 90, a base contact 91, and a small area emitter region 92. Not shown are the usual passivating oxide or glass layers and electrode connections. Since these are so well known, it is believed that the showing of these figures is unnecessary. The current flowing from emitter 92 through collector contact 90 in accordance with a predetermined bias on base contact 91 can be scaled to the planar extent of emitter region 92. This corresponds to an emitter-base junction of a given planar extent. It is the cross-sectional area that is important here. There is also shown a second transistor 53 having a collector contact 93, a base contact 94 having the same extent as base contact 91 plus two emitters 95 each about the area of the emitter 92 to provide twice the current supplied by the transistor 74. If the same bias is applied to base contact 94 as to base contact 91, the amplitude of the current flowing from emitter regions 95 through collector contact 93 will be scaled with respect to the current amplitude flowing through collector contact 90 in accordance with the ratio of the cross-sectional areas of the two emitter regions, i.e., the base emitter junction planar extent, as taken in a geographical area context. The structure of the transistor 75 is not shown but it can be similarly scaled, since all the transistors 53, 73, 74, 75 and 79 are on one chip.

The common mode voltage rejection of the input circuitry is determined by the bias constraints on the emitter and collector circuit of transistors 45 and 46. Negative input common mode voltage rejection is approximately two diode drops above the negative power supply terminal $-V_2$. The two diode drops correspond to the base-emitter voltage of either transistor 45 or 46 plus the base-emitter voltage of current source transistor 53. The positive input common mode voltage rejection is approximately one diode drop plus the resistance drop below the positive voltage supply $V_1$. Diode drop corresponds to the diode drop across diodes 48 or 49 plus the resistor drop across resistors 50 or 52, depending upon which transistor 45 or 46 is current conductive. In the event that two or more amplifying systems as shown are connected to input terminal 14, the power supply to one of the receivers may be grounded, i.e., turned off. Then the signal current would be shunted to ground through the collector-base diode or junction of transistor 45 or transistor 46 depending on which is current conductive if the diodes 48 and 49 were not in the collector circuits. Diodes 48 and 49 thereby prevent the input circuit from shunting the transmission line when more than one receiver is placed across the line and one of the power supplies has been turned off.

In the differential output switch 22, the common mode voltage rejection is determined by the bias constraint of the base drive circuits, plus the voltage breakdown of transistors 70 and 71. The negative output common mode voltage rejection is approximately equal to one junction drop, that of the transistor 62, plus a Zener voltage drop, that of the Zener diode 64, negative with respect to positive power supply $V_1$. Diode or junction drop corresponds to the voltage drop across the base-emitter junction of one of the two transistors 62 and 62′ depending upon which is conductive plus the Zener voltage of Zener diodes 64 or 64′.

In the event that two or more amplifying systems 11 are connected to the twisted pair 10 and the power supply to one of such transmitting amplifying systems was grounded or turned off, then the signal current could be shunted to ground via the collector-substrate diode present in junction isolated integrated circuits. That is, the reverse bias isolating junction of common and monolithic integrated circuits could cause this type of malfunction. A diode in series with the collectors of transistors 70 and 71 in the differential output switch 22 can be inserted to prevent such a shunting to ground by a pair of transmitting amplifiers wherein one of the amplifiers has its power supply turned off.

The current source transistor 75 in providing a regulated or constant current for the differential output switch transistors 70 and 71 increases the effective output impedance of those transistors. This increase in impedance is due to the signal isolation that transistors 70 and 71 provide for the collector of the current source transistors 75.

We claim:

1. A two-state signal amplifier system having
a pair of input terminal means and a pair of output terminal means,
differential input switch means including a pair of semiconductor switching elements having a common current source terminal and control electrodes respectively connected to said input terminal means and a pair of output electrodes,
dual voltage level translation means having a pair of inputs respectively connected to said differential input switch output electrodes for receiving signals therefrom, said dual voltage level translator including separate amplifier means and separate threshold circuit means responsive to receive signals respectively from said output electrodes for selectively providing a low or high voltage path including a pair of level translated output terminals, differential output switch means connected respectively to said output terminal means and having a common current source terminal with a pair of semiconductor switching devices therein each having a control electrode respectively connected to said level translated output terminals, current source regulator means, a plurality of independent current sources all controlled by said current source regulator means and having individual connections respectively to said current source terminals for supplying a substantially constant current flow through the respective terminals.

2. The amplifier system of claim 1 and including a voltage source terminal, a constant current path from said voltage terminal, a resistor and a diode in series circuit to each of said output electrodes of said differential input switch.

3. The amplifier system of claim 1 wherein said independent current sources each comprise a separate transistor element having a collector electrode respectively connected to said current source terminals and said level translator output terminals, a control electrode connected through a common connection to said current source regulator and an emitter electrode connected to a reference potential point, the emitter junctions of said individual current source transistors having a junction area in accordance with the desired current amplitude flowing between the collector and emitter electrodes.

4. An amplifier system including in combination, first and second input transistor elements each having emitter, collector and base electrodes with said base electrodes serving as input terminals for said amplifier with said emitter electrodes connected to a common current source connection terminal, a voltage source connection, a first and a second resistor connected to said voltage source connection, a respective diode connected between said resistors and the respective collectors of said input transistors and poled to conduct current between said voltage source terminal and said transistor electrode, a pair of dual voltage level translator means respectively connected to said collector electrodes of said input transistor elements, and each including a level translator transistor having collector, base and emitter electrodes with the collector electrode connected to said voltage source terminal, said base electrode connected between a respective resistor and the diode connected thereto, a Zener diode poled to oppose curernt flow in said level translator transistor and having a connection to said emitter electrode and another connection to a combined level translator output current source terminal, a pair of differential output switch transistor elements each having collector, base and emitter electrodes with the emitter electrodes joined to a current source terminal and said collector electrodes of said output switch transistor elements serving as output terminals for said amplifier, said base electrodes of said output switch transistor elements being connected to said level translator output terminals, current source regulator means having a reference potential connection and a control connection and supplying a constant voltage therebetween, a plurality of individual current source transistors each having collector, base and emitter electrodes and respectively having base-emitter junction areas for predetermining the amplitude of current flow between the collector and emitter electrodes, said base electrodes of said current source transistors being connected in common to said reference connection, said collector electrodes of said current source transistors being respectively connected to said current source terminals for providing a predetermined substantially constant current flow therethrough.

5. A signal processing circuit having a plurality of stages, each stage requiring a predetermined current flow therethrough, with amplitudes of said predetermined current flows being different, the improvement including the combination, a current source regulator supplying a predetermined potential across a pair of control terminals, a like plurality of transistor elements having collector, base and emitter connections, said base connections being joined together, said emitter connections being joined together, said control terminals being connected to said base and emitter connections, respectively, said collector connections being respectively connected to said stages for effecting a constant current flow, said transistor elements each having different base-emitter junction areas to determine the different amplitudes of current flow through the respective stages of said signal processing circuit, and power supply connections in said stages and at said emitter connections.

References Cited

UNITED STATES PATENTS

| | | | |
|---|---|---|---|
| 3,444,396 | 5/1969 | Fox | 307—270 X |
| 3,445,776 | 5/1969 | Leidich | 330—18 X |
| 3,452,289 | 6/1969 | Ryan | 330—30 X |

ROY LAKE, Primary Examiner

J. B. MULLINS, Assistant Examiner

U.S. Cl. X.R.

307—270, 303; 330—22, 30, 38